United States Patent [19]

Freer et al.

[11] 4,255,848
[45] Mar. 17, 1981

[54] METHOD FOR THE MANUFACTURE OF A SET OF PASSIVE ELECTRO-OPTIC DISPLAY CELLS

[75] Inventors: William G. Freer, Saint-Blaise; Jean-Luc Simon, Marin, both of Switzerland

[73] Assignee: Ebauches Electroniques S.A., Neuchatel, Switzerland

[21] Appl. No.: 89,509

[22] Filed: Oct. 30, 1979

[30] Foreign Application Priority Data

Nov. 6, 1978 [CH] Switzerland .................. 11387/78

[51] Int. Cl.³ ............................................. G02F 1/13
[52] U.S. Cl. .............................. 29/592 R; 350/331 R; 350/334
[58] Field of Search .............. 350/330, 335, 336, 342, 350/343, 344, 350 R; 29/592 R

[56] References Cited

U.S. PATENT DOCUMENTS

| 4,070,749 | 1/1978 | Misono et al. | 29/592 R |
| 4,094,058 | 6/1978 | Yasutake et al. | 29/592 R |
| 4,183,629 | 1/1980 | Nishimura et al. | 350/331 R |

Primary Examiner—Francis S. Husar
Assistant Examiner—J. A. Bacsalmassy
Attorney, Agent, or Firm—Silverman, Cass & Singer, Ltd.

[57] ABSTRACT

A set of passive display cells are manufactured by providing two superimposed glass plates on which there has been deposited groups of conductive layers in a matrix configuration. A peripheral closed belt of thermoplastic material is provided between the two plates and a set of open belts of thermoplastic material having openings is provided surrounding the groups of conductive layers. The closed belt is sealed so as to realize a closed space between the two plates. In a vessel where there is a higher pressure, the softening of the closed and open belts is produced. The two plates are then brought closer to each other under the effect of the overpressure up to a distance determined by spacing elements contained in the material of the open belts which material then is hardened. A side of the outer belt is eliminated and the cells are filled with a liquid crystal under vacuum. The cells then are separated from each other still under vacuum, and the openings of the open belts are closed.

10 Claims, 3 Drawing Figures

METHOD FOR THE MANUFACTURE OF A SET OF PASSIVE ELECTRO-OPTIC DISPLAY CELLS

BACKGROUND OF THE INVENTION

The present invention relates to a method of manufacturing a set of passive electro-optic display cells comprising two superposed plates maintained at distance from one other by sealing material situated at their periphery and between which is imprisoned a liquid crystal.

The realization of such cells is generally obtained piece by piece, which necessitates numerous manipulations and, consequently, is extremely expensive.

One has attempted to simplify the operations for sealing the plates constituting the cells by working these plates in straps or belts or strips. But that only permits a limited gain due to the fact that the number of the cells obtainable on a strip can only be low.

The purpose of the present invention is to further rationalize this manufacturing by manufacturing a set of cells which are preferentially arranged in a matrix. This reduces the manipulations and facilitates these manipulations due to the fact that they are applied to elements of greater dimensions, with an easy passage from the realization of one type of cells to the realization of another type of cells of dimensions.

The difficulty in using square or rectangular plates of relatively great dimensions lies in the spacing or putting to a distance of these plates, which spacing must not only be perfectly precise but also be constant across the whole surface of the two plates. The usual means used for the manufacturing of the cells in a piece by piece manner consists in loading the upper plate with calibrated weights, which are not usable here.

This problem has been solved owing to the means as claimed.

BRIEF DESCRIPTION OF THE DRAWING

The drawing shows, by way of example, one embodiment of the invention.

DESCRIPTION OF THE PREFERRED EMBODIMENT

Figure 1:
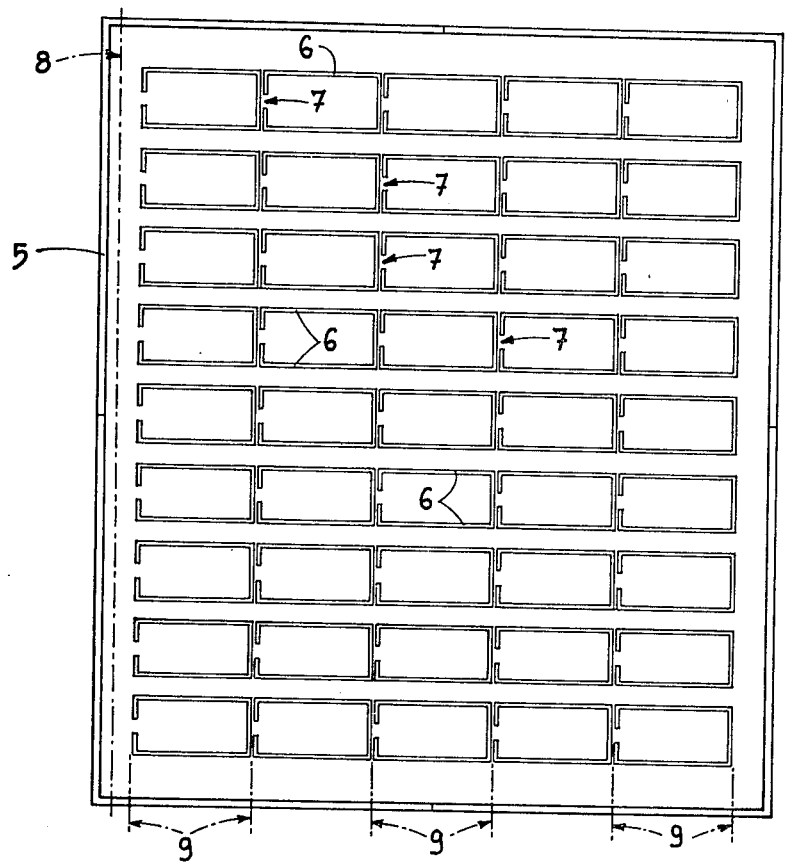
FIG. 1 is a plan view of a set of passive electro-optic display cells during their manufacturing.
Figure 2:
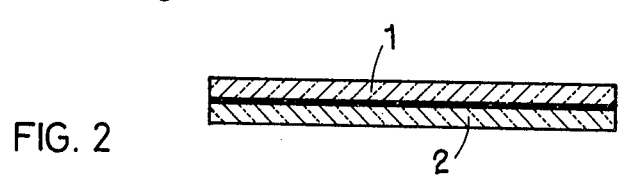
FIG. 2 is an elevational view of the said set, the thicknesses of the represented elements having been exaggerated for clarity of the drawing.
Figure 3:
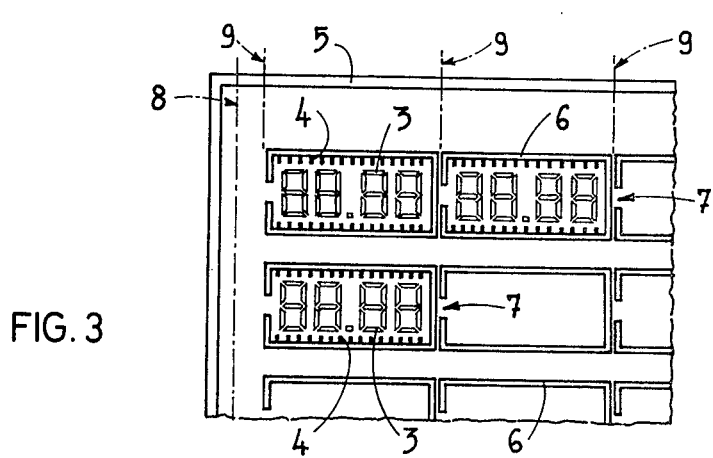
FIG. 3 is a view of a detail of FIG. 1 at a larger scale.

One uses for the realization of a set of passive electro-optic display cells, comprising fourty-five individual cells in the example as represented in the drawing, two square glass plates 1 and 2, of 10 cm length of a side, for instance. One effects the deposition on these two plates of groups of metallized layers constituting the display elements 3 (segments) and the conductive tracks 4 of each of the cells of the set, these groups being disposed in matrices.

Then, one treats one face of each of the plates 1 and 2 intended to be at the inside of the cell with an oblique evaporation or by rubbing so as to create on these plates alignment layers of the liquid crystal of the display cells.

One then effects on one of the plates, the deposition by serigraphy with elimination of the solvent to constitute a solid film, of a closed belt 5 made of thermo-hardenable plastic material, along the periphery of the one plate. The thickness of this film will be about 20 μm.

One then effects on the one or the other plate, the deposition of a thermo-hardenable material such as an epoxy resin containing spacing elements, for instance balls, having the configuration of a set of bolts 6 each open at 7 and each surrounding one of the groups of the display elements 3 and the conductive tracks 4. These several open belts 6 are thus disposed matrices as the conductive tracks. The thickness of the film of epoxy resin of belts 6 thus realized will be about 15 μm, the used material for the belt 5 and for the belts 6 being such that their melting point will be substantially the same.

The plates 1 and 2 are then superimposed in such a way that the conductive layers they carry coincide and heat is applied to their periphery only, to produce the softening of the film constituting the closed belt 5. After cooling, this film is again hardened, which produces a seal such that the space situated inner of the belt 5 between the two plates is entirely closed.

The two plates thus assembled are placed on a hot plate in an autoclave in which there is applied a pressure higher than the atmospheric pressure under which the sealing of the two plates has been effected. This overpressure urges the two plates closer to each other. The material of the belt 5 and of the belts 6 is softened under the effect of the heat until the distance authorized or provided by the spacing elements contained in the epoxy resin constituting the belts 6 is reached. The temperature and the pressure are then maintained for a sufficiently long time so that the epoxy resin does polymerize and hardens to connect the two plates 1 and 2 together and form a set of sealing frames limiting every one of the future cells. The temperature and the pressure then are brought back to their room values.

One then breaks the plates 1 and 2 along one of the edges thereof, for instance along the line 8 of FIG. 1, which eliminates one of the sides of the belt 5. Due to the fact that the pressure in the space comprised between the two plates is slightly higher than the atmospheric pressure, there is no risk that dust or impurities enters untimely into this space, that is to say inside the future cells. One then places the two plates in a vessel under vacuum which eliminates the air situated between the two plates and, in this vessel, one immerges the plates into a liquid crystal. One provides air to enter into the vessel again to urge the liquid crystal to totally engage the spaces situated inside the belts 6.

The several cells then are separated from each other by sawing, while the breaking along the line 8 is effected, previously, by grooving the two plates and breaking the whole.

The last operation consists in closing the openings 7 of the belts 6 so as to prevent the liquid crystal from escaping. This is carried out by known techniques, for instance by introducing a stud of epoxy resin or of thermoplastic material into the said apertures or openings 7.

Concerning the filling of the cells, it is to be noted that instead of breaking the edge of the plates along line 8, one could also reduce the matrix into strips by breaking the plates along lines 9 of FIG. 1, and proceed with the filling of each of the strips. In this case, the openings 7 will be closed by known techniques using epoxy resins or thermoplastic material. One could also metallize these apertures or openings before filling, then effect the sealing by welding.

We claim:

1. Method of manufacturing a set of passive electro-optic display cells having two superimposed plates maintained at a distance from each other by sealing material situated at their periphery and between which is imprisoned a liquid crystal, comprising: providing two plates having dimensions greater than each of the cells of the set, depositing on these plates in a matrix configuration juxtaposed groups of conductive layers constituting in each group the display elements and the conductive tracks of each cell, placing sealing material on at least one of the plates to form a closed belt surrounding all the groups of conductive layers deposited on the plates, and to form a set of open belts surrounding each group of conductive layers, superimposing the plates, producing the softening followed by the hardening of only the closed belt, thus providing between the two plates a closed space enclosing the whole of the open belts, submitting the plates to a pressure which is higher than the pressure under which the closing of the said closed space has been effected, while the plates remain submitted to this overpressure, producing the softening of the material constituting the open and closed belts, the material of the open belts containing elements for spacing of the plates, said overpressure producing the bringing together of the two plates up to the distance provided for by the said spacing elements, and then producing the hardening of the material of the open belts at least, providing at least one opening in the closed belt, placing the two plates in a vessel under vacuum so as to eliminate the air contained between them, filling the space between the places with a liquid crystal, cutting the plates so as to separate, at least partially, one from each other the cells of the set, and closing the passages provided between the ends of the open belts.

2. The method as claimed in claim 1, in which the closed belt is formed along the periphery of the plates and the periphery of the superimposed plates is heated locally to soften only the closed belt and provide the closed space surrounding all the open belts.

3. The method as claimed in claim 1, further including before depositing on the plates conductive layers constituting the display elements and the conductive tracks of the cells, providing on each of the plates an alignment layer for the molecules of the liquid crystal.

4. The method as claimed in claim 1, in which the thermoplastic material of the closed belt and of the open belts is placed by serigraphy.

5. The method as claimed in claim 1, in which the material of the closed belt is a thermoplastic material placed with a thickness of about 20 $\mu$m.

6. The method as claimed in claim 1, in which the material of the open belts is epoxy resin placed with a thickness of about 15 $\mu$m.

7. The method as claimed in claim 1, in which the softening of the open belts is effected in a heated vessel in which the pressure is higher than the pressure under which the sealing of the closed space situated between the plates has been effected.

8. The method as claimed in claim 1, including providing quadrangular plates on which the elements of the cells of the set to be realized—conductive layers and open belts—are juxtaposed.

9. The method as claimed in claim 8, in which filling of the space between the plates with a liquid crystal includes breaking one of the edges of the plates so as to destroy one side of the closed belt.

10. The method as claimed in claim 8, in which filling the space between the plates with a liquid crystal includes cutting the plates to form strips of cells.

* * * * *